Aug. 13, 1940.　　　W. E. HUBBARD　　　2,211,656

SAFETY VALVE

Original Filed Jan. 20, 1939

INVENTOR:
William E. Hubbard
BY Barry + Cyr
ATTORNEYS.

Patented Aug. 13, 1940

2,211,656

UNITED STATES PATENT OFFICE 2,211,656

SAFETY VALVE

William E. Hubbard, Tulsa, Okla., assignor to Hydraulic Pumper Incorporated, Tulsa, Okla., a corporation of Oklahoma Original application January 20, 1939, Serial No. 252,032. Divided and this application January 24, 1939, Serial No. 252,682

3 Claims. (Cl. 277—54)

This invention relates to improvements in a safety valve, and more particularly but not by way of limitation to an improved safety valve for use with a long stroke balanced hydraulic pump of the type shown in my copending application Serial No. 252,032, filed Jan. 20, 1939, of which the present case is a division.

In balanced hydraulic pumps cooperating with a sucker rod for oil well pumping, it has been found that any rod breakage in the well would relieve the load causing increased fluid velocity in the hydraulic pump which if allowed to continue would have a detrimental effect upon the working parts of the pump. Furthermore any sudden stoppage of the normal flow of fluid in the pump would consequently cause an unusual and sudden stoppage of the working parts creating undue shocks and distortion in the working parts.

It is therefore an important object of this invention to provide a valve construction for use with a fluid pump which will automatically decrease any increased fluid velocity to prevent detrimental damage to the working parts of the pump.

And still a further object of this invention is to provide an improved valve construction for use with a fluid pump which diminishes any exaggerated flow of the fluid, however is of such construction that the fluid flow is not completely stopped, but provides for a slight flow to the working parts of the fluid pump whereby undue shock and distortion of the working parts is prevented.

Other objects and advantages of my invention will be evident from the following detailed description read in conjunction with the accompanying drawing which illustrates one form of my new invention.

Figure 1:
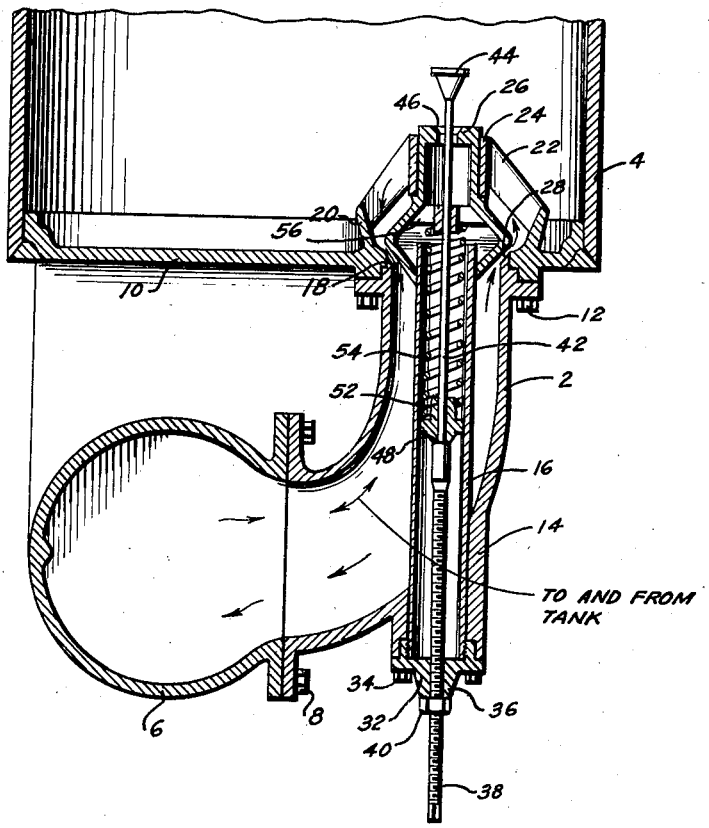
Fig. 1 is a vertical sectional view of the improved valve structure arranged at the bottom of a balancing tank of the pump.
Figure 2:
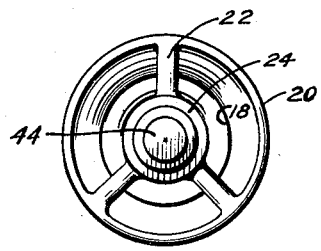
Fig. 2 is a top view of the valve structure.

Referring to the drawing in detail the improved safety valve is shown disposed in a conduit 2 providing communication between a fluid tank 4 and a valve housing 6 forming part of the balanced hydraulic pump of my copending application above referred to. The tank 4 contains a fluid under pressure adapted to reciprocate a piston unit (not shown) contained in the tank, it being understood that the piston unit does the work of the hydraulic pump.

One end of the conduit 2 is secured to the housing 6 by the bolts 8 with its opposite end secured to a bottom plate or head 10 of the tank 4 by the bolts 12. The conduit is provided with a depending apertured boss 14 having the lower end of a cylinder 16 disposed therein. The upper extremity of the conduit 2 extends into an aperture 18 provided in the bottom plate 10, and immediately adjacent the aperture 18, the plate 10 is provided with a slightly inclined annular flange 20. A spider 22 is fixed to the inner periphery of the flange 20 and extends upward into the tank 4. The spider 22 preferably consists of three arms supporting an annular guide 24 for the head 26 which reciprocates vertically. The head is hollow, and its lower end is of greater diameter than cylinder 16, and although the upper end of the cylinder extends into the valve head, fluid can flow through the head for a purpose hereinafter explained. The lower portion of the head is of substantially frusto-conical shape, so that its outer surface may engage a tapered valve seat 28 at the upper end of the conduit. The cylinder 16 is threadedly secured at its lower end, to a cover plate 32 which in turn is secured to the boss 14 by bolts 34. The cylinder 16 extends upwardly in the conduit 2 to a position substantially parallel with the valve seat 28. The cover plate 32 has an apertured boss 36 for the reception of an adjusting screw 38 extending upwardly into the cylinder 16, and held in any desired adjusted position by a lock nut 40. The screw shaft 38 has an upper unthreaded portion 42 extending upward through the valve head 26, and terminating in a tapered head 44, cooperating with a tapered seat 46 provided at the upper end of the passageway that extends through the head 26. The unthreaded shaft 42 is of a smaller diameter than the shaft 38, and at the point of their connection the shaft has a shoulder portion 48 against which a washer 52 abuts. A helical spring 54 disposed within the cylinder 16 bears at one end against the washer, and at its opposite end against a spider 56 integral with the valve head 26.

It will be understood that in the actuation of the pump referred to that there is a flow of fluid between the housing 6 and the tank 4. With fluid flowing from housing 6 to the tank 4 the valve head 26 is held in open position by tension of the spring 54, allowing passage of the fluid into the interior of the tank 4. With the flow of fluid from the tank 4 to the housing 6 under normal velocity the spring has enough tension to hold the valve 26 open allowing passage of fluid thereby. If for any reason the pump unit becomes unbalanced for example, a rod breakage in the well relieving the pump load, the fluid velocity from the tank to the housing 6 would be greatly increased, which if allowed to continue would cause damage to the working parts of the pump unit. Any substantial increase of fluid velocity acts with enough force against the valve head 26 to overcome the tension of the spring 54, causing the valve head to seat on the annular seat 28. With the valve head 26 seated, obviously, fluid is prevented from flowing from the tank 2 into the housing 6 and to the piston unit (not shown).

Any sudden stoppage of the flow of fluid would obviously cause an unusual and sudden stoppage of the working parts of the pump unit, tending to cause detrimental shocks and distortion. In order to prevent a complete stoppage of the flow of fluid from the tank, some of the fluid in the tank is allowed to flow from the tank through normally open head 44, so that the working parts of the pumping apparatus (not shown) will be allowed to reciprocate slowly in a pumping stroke thus preventing undue shock.

The screw 38 can be rotated in a counterclockwise direction, when desired, to move the valve head 44 downward, into seating relationship with the aperture 46, thus relieving the tension of the helical spring 54, which causes the valve head 26 to engage its seat 28, thereby shutting off all the fluid flow from the tank 2. This procedure is advantageous in that any overhauling or repairing of the pump may be done without removing the air or fluid pressure condition normally present in the tank 4.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. A safety valve for use with a pump comprising a conduit for receiving a fluid, a cylinder disposed in the conduit, a valve, a valve seat provided at one end of the conduit and cooperating with the valve, tension means disposed in the cylinder to normally hold the valve away from the seat, screw means disposed in the cylinder for adjusting the tension means, said screw means provided with a second valve to allow flow of fluid therethrough upon closing of the first mentioned valve.

2. A safety apparatus for a pump comprising an annular valve, a conduit, a valve seat provided on the conduit adapted to cooperate with the valve, a cylinder disposed in the conduit, tension means disposed within the cylinder and contacting the valve to normally hold the valve in an unseating position, means within the cylinder for adjusting the tension means, means on the end of the adjusting means comprising a second valve adapted to cooperate with the means in the first mentioned valve to allow passage of fluid thereto upon closing the first mentioned valve.

3. In a safety apparatus for a pump comprising a conduit, a valve cooperating with the conduit, a cylinder disposed in the conduit, an adjustable shaft extending into the cylinder and supporting a spring under tension, said spring contacting the valve to hold it in unseating position to allow normal flow of fluid through the conduit, said valve adapted to close against a valve seat upon any increase circulation of fluid in the conduit, a frusto-conical valve provided on one end of the adjusting shaft and adapted to cooperate with a frusto-conical aperture provided in the first mentioned valve whereby a slight flow of fluid is allowed when the first mentioned valve is in seating position.

WILLIAM E. HUBBARD.